June 14, 1955     O. O. WATSON     2,710,620
SAFETY CUT-OFF VALVE FOR FLUID OPERATED BRAKES
Filed Jan. 21, 1953
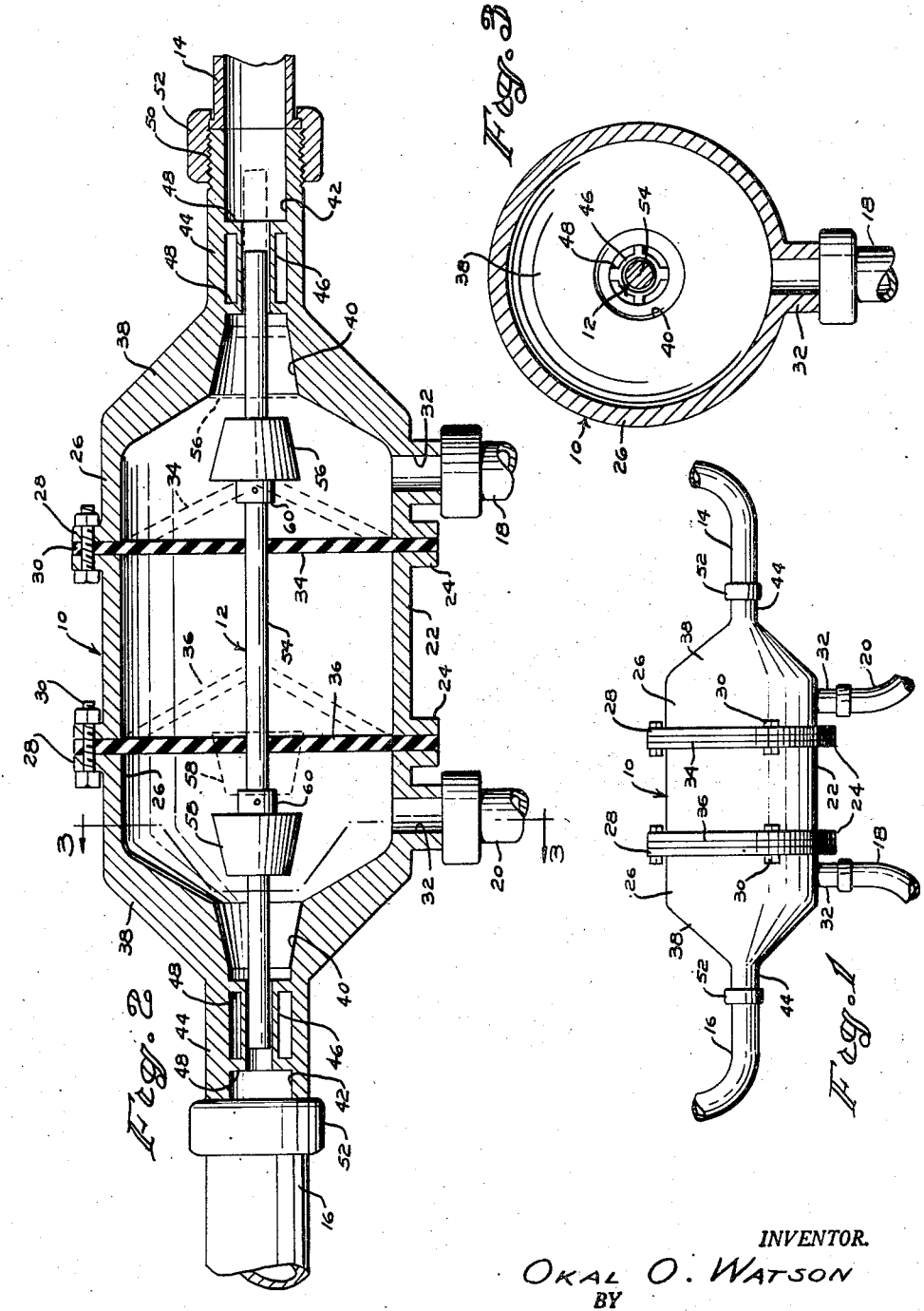
INVENTOR.
OKAL O. WATSON
BY
McMorrow, Berman & Davidson
ATTORNEYS

United States Patent Office 2,710,620
Patented June 14, 1955

2,710,620

SAFETY CUT-OFF VALVE FOR FLUID OPERATED BRAKES

Okal O. Watson, Vail, Wash.

Application January 21, 1953, Serial No. 332,257

2 Claims. (Cl. 137—100)

This invention relates to a safety cut-off valve, intended mainly for use in an air brake system such as those used on heavy trucks, but which is equally well adapted for incorporation in a hydraulic brake system.

Summarized briefly, the invention is a safety cut-off valve assembly designed for connection in the fluid pressure line leading to each wheel brake of the vehicle. The assembly includes a relatively elongated, hollow casing closed at its opposite ends, the ends of the casing having inlets for air under pressure, hydraulic brake fluid, or other pressure fluid. Formed in the side wall of the casing, adjacent said ends thereof, are outlets, each outlet being exclusively associated with the inlet adjacent thereto, so as to provide flow of fluid under pressure into the ends of the casing from opposite directions, and then through the respective outlets, to the brake chambers or wheel cylinders of two different wheels of a vehicle. A pair of diaphragms is mounted in the casing, said diaphragms being spaced longitudinally of the casing, with each outlet being disposed between the diaphragm nearer thereto and the adjacent inlet. Fixedly connected to both of the diaphragms is a single reciprocating valve stem mounted for movement in a line extending longitudinally and centrally of the casing, said valve stem being provided with a pair of valve members. The valve members are normally unseated when pressure is maintained against the diaphragms by pressure fluid flowing into the opposite ends of the casing outside of the diaphragms. Said valve members are, however, adapted to close a related inlet, responsive to a loss of pressure outside of either one of the diaphragms.

Through the medium of a construction summarized above, I propose to close off the line extending to any wheel of the vehicle, if a trouble condition, such as a rupture, occurs in said line. The closing off of any particular line will not, however, cause any other line to be closed off, and thus, braking power is maintained on all the wheels of the vehicle that are unaffected by said trouble condition.

The invention has been devised for the purpose of eliminating what is believed to be a serious condition now existing in conventional brake systems of the air or hydraulic type. In such systems, the loss of pressure at any point in the system, due to rupturing of a brake line, will cause pressure to be lost throughout the system, and thus the vehicle is without braking power.

Among important objects of the invention are to provide a safety cut-off valve assembly of the type stated which can be incorporated in conventional brake systems without substantial modification or redesign of said systems; which can be manufactured at relatively low cost; will be substantially trouble free in operation; and will be instantaneously responsive to a trouble condition of the character described above.

Other objects will appear from the following description, the claims appended thereto, and from the annexed drawing, in which like reference characters designate like parts throughout the several views, and wherein:

Figure 1 is a side elevational view of a safety cut-off valve assembly according to the present invention;

Figure 2 is an enlarged longitudinal sectional view; and

Figure 3 is a transverse sectional view taken on line 3—3 of Figure 2.

Referring in detail to the drawings, the illustrated device comprises a hollow, relatively elongated casing 10, closed at its opposite ends. The numerals 14 and 16 designate air or hydraulic fluid input lines connected in communication with the interior of the casing at opposite ends thereof, and the numerals 18 and 20 designate fluid outlet lines disposed adjacent to the opposite ends of the casing and extending through the sidewall thereof.

The casing 10 includes a center section 22 of cylindrical formation, having outwardly directed, circumferentially extending end flanges 24. End casing sections 26 are disposed at opposite ends of the center section, said end casing sections having, at their inner ends, circumferentially extended flanges 28 connected to the flanges 24 by a circumferential series of bolts 30.

In each end section 26, there is formed an outlet 32, said outlet of each section being provided in the side wall thereof, and connected to the outlet line 18 or 20, respectively.

A pair of resilient and stretchable diaphragms 34, 36 are mounted in the casing, said diaphragms being spaced longitudinally of and extending transversely across the casing. The diaphragms are disposed at opposite ends of the center section 22, and are sealably engaged, throughout their peripheries, between the flanges 24, 28 respectively. Thus, the casing is partitioned into a center chamber located between the diaphragms, in which a constant pressure will be maintained, and end chambers disposed between the respective diaphragms and the ends of the casing adjacent thereto.

Each casing section 26 is integrally formed with a conical end wall 38, and each end wall 38 has a tapered valve seat 40 formed therein. The smaller ends of the valve seats 40 open into inlet bores 42 disposed axially of the casing and formed in axial extensions 44 projecting outwardly from the respective end walls 38.

In each bore 42 there is provided a guide sleeve 46 concentric with the bore 42, and formed integrally at its opposite ends with spiders 48 extending to the side wall of the bore 42.

Each of the extensions 44 is externally threaded as at 50, for engagement with a coupling nut 52, which serves to connect the associated fluid inlet line 14 or 16, as the case may be, in communication with the end chambers of the casing.

The device includes a valve assembly comprising an elongated valve stem or rod 54. The rod 54 is disposed axially of the casing, and has its opposite ends slidably mounted in the bores of the respective guide sleeves 46, thus to mount the valve stem for reciprocation within the casing along a line extending longitudinally and centrally thereof.

The valve stem 54 extends through center openings provided in the diaphragms 34, 36, the stem being fixedly and sealably secured to both of the diaphragms at the point where it extends through said diaphragms.

Fixedly mounted upon the opposite end portions of the stem 54, within the end chambers of the casing, are valves 56, said valve members being tapered to fit the valve seats 40. The valves 56 are, during the manufacture of the device, disposed at selected locations upon the valve stem, and are held in said locations by collars 60 circumposed upon and secured to the valve stem.

As shown in Figure 2, in which all the parts of the device are shown in their normal positions, both of the valves 56, 58 are unseated and the diaphragms 34, 36 are disposed in planes normal to the line of reciprocation of the stem 54. In this condition of the components of the device, pressure fluid is free to flow through both inlets, through the end chambers communicating with the inlets, and out through the outlets 32. Thus, the device does not interfere with the normal braking action of the vehicle brake system.

It is to be noted that the diaphragms 34, 36 are maintained in their normal unflexed positions by the pressure of the incoming fluid against their outer sides and by the relative incompressibility of the air in the chamber between the diaphragms.

Assuming that a rupture suddenly occurs in the brake line extending to one of the wheels, and having the lines 14 and 18 as parts thereof, the pressure against one of the diaphragms 34 would drop, while the pressure on the other diaphragm would persist. This would cause the diaphragms 34 to move to the dotted line positions shown in Figure 2.

As a result, both diaphragms, the valve stem 54, and the valve 56, 58 will move to the dotted line position shown in Figure 2, causing the valve 56 to seat. This will close the flow of pressure fluid through lines 14, 18, thus cutting off the affected brake line, while leaving all other brake lines unaffected.

It will be understood that if a trouble condition arises in another brake line, such as the line including the conduits or lines 16, 20, the diaphragms would move toward the left in Figure 2, shifting the valve stem therewith and causing the valve 58 to seat while the valve 56 remains unseated.

It will be readily observed that the construction which I have devised represents a desirable safety feature, in a conventional air or hydraulic brake system of a vehicle, since the device causes any ruptured or broken wheel line to be cut out of the rest of the brake system, the cutting out of the affected line being effected instantaneously, responsive to a dropping of pressure therein. It is thought to be an important characteristic of the invention, in this regard, that the high pressure remaining in the associated, unaffected brake line aids in cutting off the affected line.

It is also thought to be an important characteristic of the invention that it can be incorporated in a conventional system with little difficulty, it being merely necessary that the lines extending to two of the wheels be connected to the device so as to cause the flow of pressure fluid to be directed through the respective end chambers of the device, with each wheel line being cut and having its cut ends connected to the inlet and outlet at one end of the device.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a safety cut-off valve, a hollow cylinder having a sidewall, said cylinder having closed ends, said ends having inward sides, tapered valve seats opening through said inward sides, a pair of spaced imperforate flexible and stretchable diaphragms disposed across the interior of the cylinder in spaced relation to said ends and defining a middle static air compartment between the diaphragms and end compartments between the diaphragms and said ends, fluid pressure input lines connected in communication with said valve seats, fluid pressure outlet lines traversing the sidewall of the cylinder and entering the related end chambers, a single valve stem arranged axially in the interior of the cylinder having end portions projecting beyond the diaphragms toward the related valve seats, said valve stem traversing and being secured to the diaphragms, and tapered valves fixed on said valve stem end portions, said valves being disengaged from said seats in unfixed positions of said diaphragms while fluid pressure in said end chambers is equal, said diaphragms being arranged to flex toward one of the cylinder ends whenever pressure in one of said end chambers drops and pressure in the other end chamber persists and thereby seat a valve in the seat of the related cylinder end.

2. In a safety cut-off valve, a hollow cylinder having a sidewall, said cylinder having closed ends, said ends having inward sides, tapered valve seats opening through said inward sides, a pair of spaced imperforate flexible and stretchable diaphragms disposed across the interior of the cylinder in spaced relation to said ends and defining a middle static air compartment between the diaphragms and end compartments between the diaphragms and said ends, fluid pressure input lines connected in communication with said valve seats, fluid pressure outlet lines traversing the sidewall of the cylinder and entering the related end chambers, a single valve stem arranged axially in the interior of the cylinder having end portions projecting beyond the diaphragms toward the related valve seats, said valve stem traversing and being secured to the diaphragms, and tapered valves fixed on said valve stem end portions, said valves being disengaged from said seats in unfixed positions of said diaphragms while fluid pressure in said end chambers is equal, said diaphragms being arranged to flex toward one of the cylinder ends whenever pressure in one of said end chambers drops and pressure in the other end chamber persists and thereby seat a valve in the seat of the related cylinder end, said cylinder ends having tubular extensions having bores in communication with the fluid input lines and said seats, and perforated guides in said bores, said guides having bores slidably receiving end portions of said single valve stem.

References Cited in the file of this patent

UNITED STATES PATENTS

| | | |
|---|---|---|
| 1,798,317 | Eaton | Mar. 31, 1931 |
| 2,313,797 | Bailey | Mar. 16, 1943 |
| 2,386,585 | Blank | Oct. 9, 1945 |
| 2,534,871 | Lichtman | Dec. 19, 1950 |
| 2,578,042 | Chandler | Dec. 11, 1951 |

FOREIGN PATENTS

| | | |
|---|---|---|
| 333,365 | Great Britain | Aug. 14, 1930 |